United States Patent [19]

Buckley

[11] Patent Number: 4,715,479
[45] Date of Patent: Dec. 29, 1987

[54] RETRACTION TYPE SUPPORT ASSEMBLY FOR A FLOATING CALIPER DISC BRAKE

[75] Inventor: James A. V. Buckley, Whitefish Bay, Wis.

[73] Assignee: Hayes Industrial Brake, Inc., Mequon, Wis.

[21] Appl. No.: 875,295

[22] Filed: Jun. 17, 1986

[51] Int. Cl.$^4$ ............... F16D 55/02; F16D 65/14
[52] U.S. Cl. ............... 188/71.8; 188/72.3; 188/73.43; 188/205 R; 188/196 P; 188/216
[58] Field of Search ............ 188/72.3, 71.7, 71.8, 188/73.43, 73.44, 73.45, 71.9, 73.35, 196 P, 196 P, 205 R, 216, 72.7–72.9; 192/111 A

[56] References Cited

U.S. PATENT DOCUMENTS

| | | | |
|---|---|---|---|
| 3,416,634 | 12/1968 | Swift | 188/73.44 |
| 4,051,927 | 10/1977 | Karasudani | 188/73.44 |
| 4,296,843 | 10/1981 | Nishiyama | 188/73.43 |
| 4,436,186 | 3/1984 | Ritsema et al. | 188/71.8 |
| 4,458,790 | 7/1984 | Hoffman, Jr. et al. | 188/71.8 |
| 4,488,622 | 12/1984 | Stoka | 188/73.45 |

FOREIGN PATENT DOCUMENTS 41450 12/1981 European Pat. Off. ........... 188/72.3

*Primary Examiner*—Douglas C. Butler
*Attorney, Agent, or Firm*—Ronald E. Barry

[57] ABSTRACT

A floating caliper disc brake including a fixed mounting block, a caliper mounted to float on the fixed mounting block and being located in a position to bridge the edge of a disc, a first friction pad supported by the caliper for movement into engagement with one side of the disc, a housing mounted on said caliper on the opposite side of the disc, a second friction pad supported in the housing for movement into engagement with the other side of the disc, the caliper moving in response to the engagement of the second friction pad with the disc to move the first friction pad into engagement with the other side of the disc and a rubber spring on the mounting block to bias the caliper on release of the second friction pad from the disc to release the first friction pad from the disc, the caliper being free to move with respect to the ribs wherever the retraction capability of the ribs is exceeded by the movement of the caliper.

15 Claims, 9 Drawing Figures

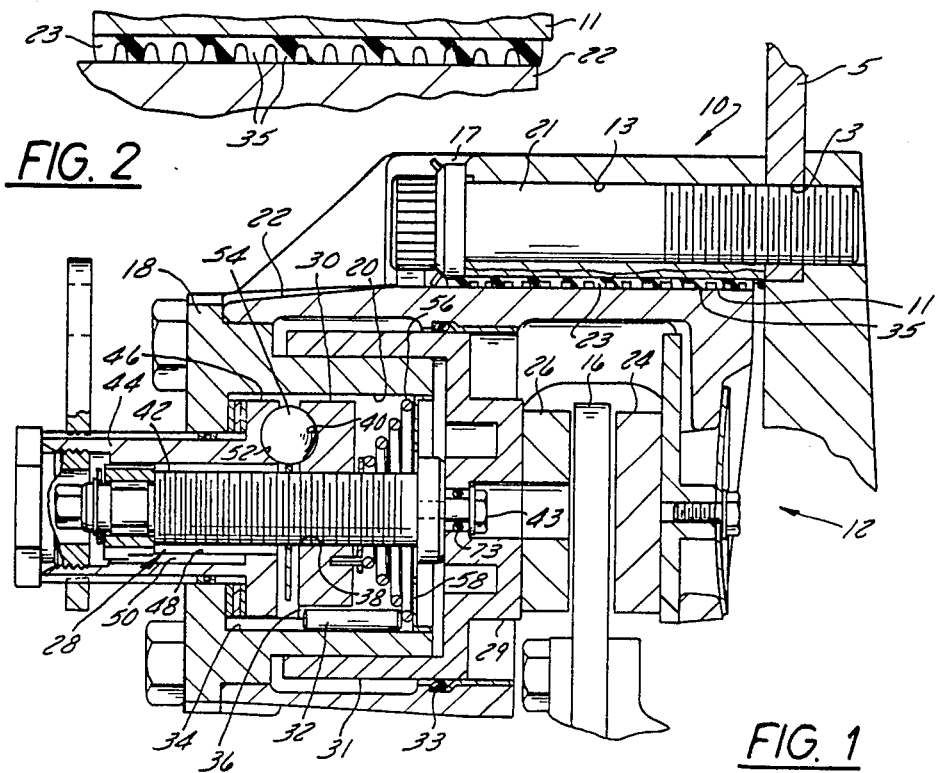
FIG. 2
FIG. 1
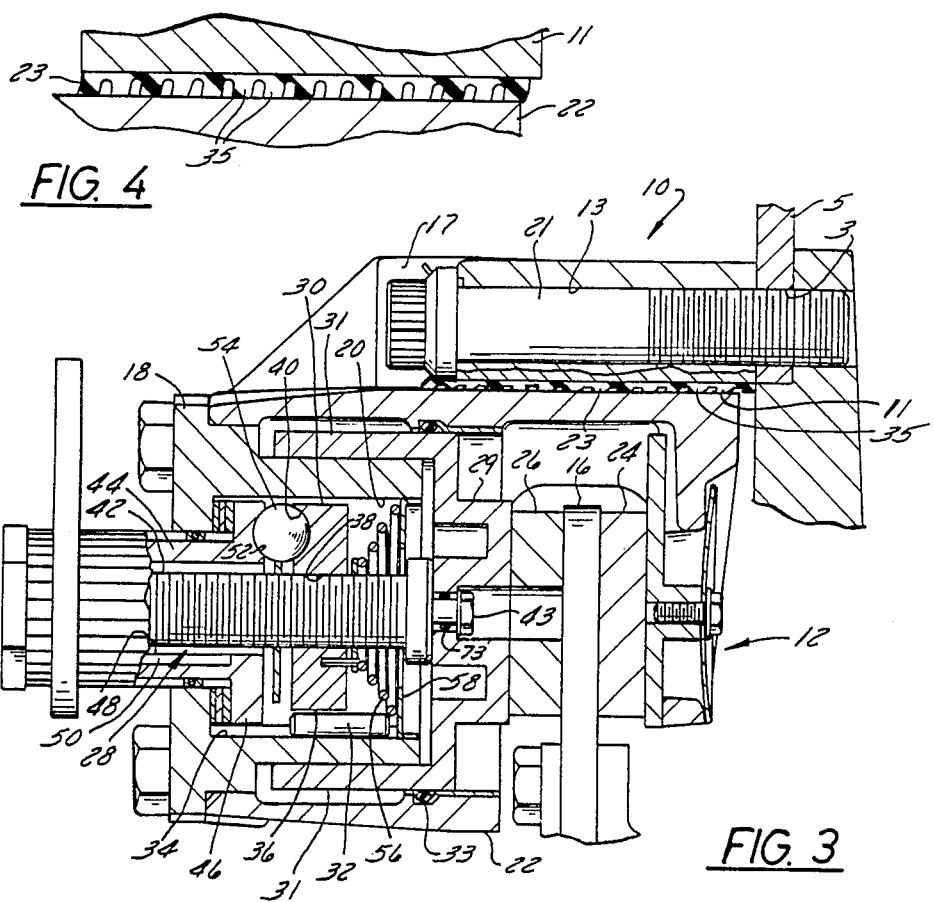
FIG. 4
FIG. 3

RETRACTION TYPE SUPPORT ASSEMBLY FOR A FLOATING CALIPER DISC BRAKE

BACKGROUND OF INVENTION

Floating caliper brakes of the type contemplated herein are used to impose a frictional force on both sides of a rotary disc in order to stop the disc from further rotation. A floating caliper brake generally includes a pair of friction pads mounted on opposite sides of the disc in opposing relation thereto. One of the pads is mounted for movement toward the disc and the other pad is mounted on a caliper that straddles the disc in order to apply frictional forces to both surfaces of the disc. The friction pads move in equal and opposite directions so that the frictional forces applied to the rotating disc are equal and opposite. Since the disc rotates in a fixed plane, the caliper is mounted to float on the brake support in order to allow the pads to move in opposite directions into engagement with the disc. On release of the pads from the disc, it is desirable to have both pads retract far enough to allow the disc to rotate freely. The movable friction pad is moved away from the disc by the actuating mechanism. However, the caliper is not provided with any means for moving the other pad away from the disc and, therefore, does not always fully release from the disc. Consequently, with the continued rotation of the disc there will be a slight friction force applied by the friction pad to the opposite side of the disc.

SUMMARY

The floating caliper support of the present invention provides a bias force to retract the caliper or bridging member and thereby release the friction pad carried by the bridging member from the face of the rotating disc. This has been accomplished by mounting the caliper on a fixed support having a resilient liner molded thereon so that it is located between the fixed support and the bridging member. The liner is provided with a strip of ribs in the form of a serrated elastomeric spring which is located in a position to move with the bridging member when the friction pads are moved into engagement with the disc. The serrated spring will be stressed by the movement of the bridging member and will retract the bridging member when the brake is released to move the brake pad on the bridging member away from the surface of the rotating disc. In self-conpensating type calipers, the bridging member must be free to move with respect to the disc in order to compensate for wear of the brake pads. Whenever the retraction capability of the serrated spring is exceeded, the bridging member will slip with respect to the spring; however, the retraction capability of the spring will not be affected.

IN THE DRAWINGS

FIG. 1 is a side elevation sectional view of a floating self-compensating caliper brake mounted on a fixed support with the serrated spring shown in a neutral position.

FIG. 2 is an enlarged view of a section of the spring in the neutral position.

FIG. 3 is a view similar to FIG. 1 with the friction pads and the spring in the operative mode.

FIG. 4 is an enlarged view of a section of the spring shown in the operative mode.

DESCRIPTION OF INVENTION

Figure 5:
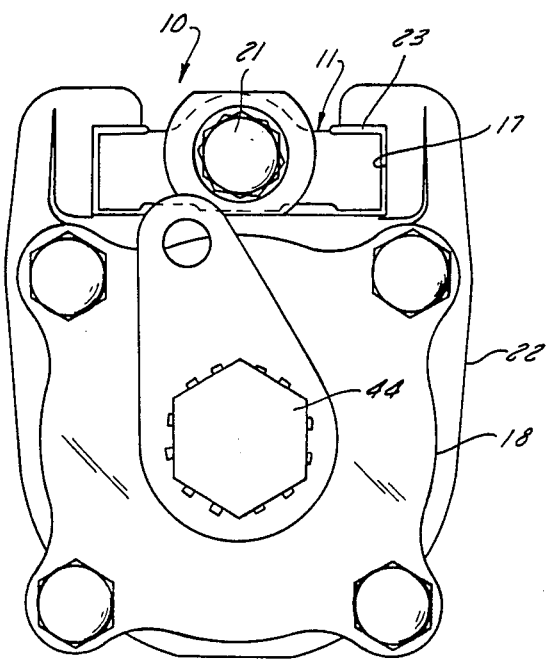
FIG. 5 is an end view of the floating caliper brake shown mounted on the brake support assembly.
Figure 9:
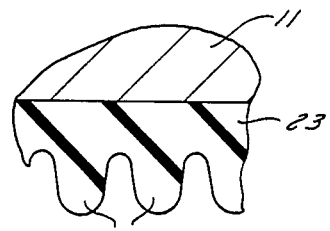
FIG. 9 is an enlarged section view of a portion of the grease seals taken on line 9—9 of FIG. 6.
Figure 6:
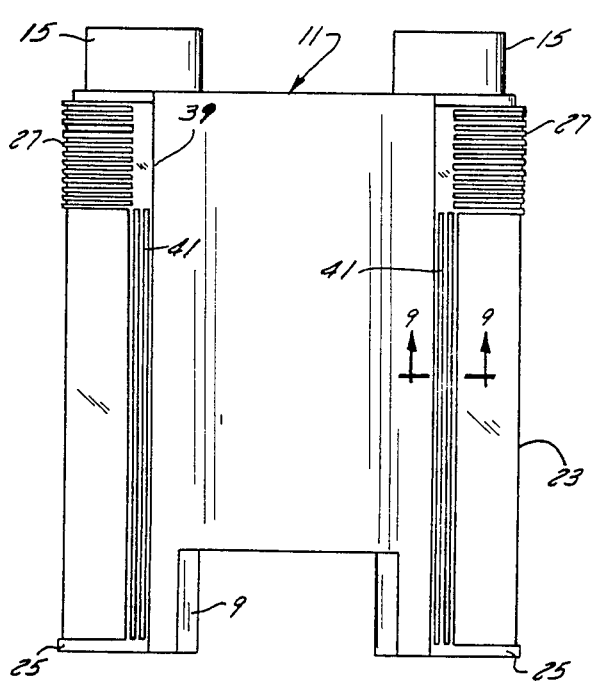
FIG. 6 is a top view of the brake support assembly showing the grease seals on the liner.
Figure 8:
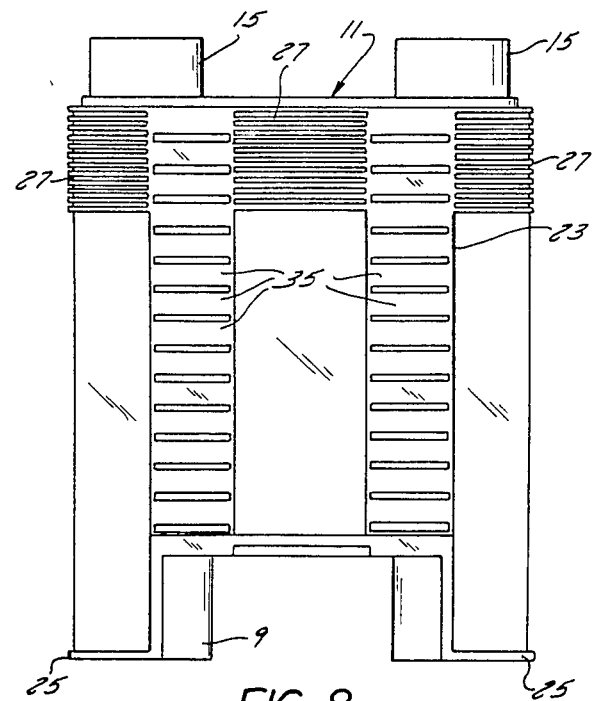
FIG. 8 is a bottom view of the brake support assembly showing two strips of ribs which form the serrated spring.
Figure 7:
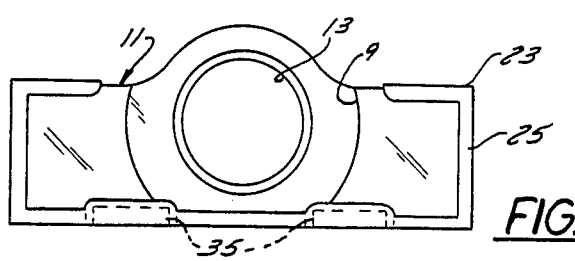
FIG. 7 is an end view of the brake support assembly.

The brake support assembly 10, as seen in FIGS. 1 and 2, is used to support a floating caliper-type disc brake 12 which is used to apply frictional forces to both sides of a disc 16 in order to stop the rotation of the disc. The brake generally includes a housing 18 having a bore 20 and a caliper or bridging member 22. A first friction pad 24 is supported by the bridging member in a position to engage one side of the disc 16. A second friction pad 26 is supported in the housing 18 for axial movement into engagement with the opposite side of the disc 16 by means of a self-compensating assembly 28 located in the bore 20 in the housing 18.

More particularly, the self-compensating brake assembly 18, as seen in FIGS. 1 and 2, is of the type disclosed in copending application Ser. No. 720,952 filed Apr. 8, 1985, entitled "Self-Adjusting Caliper" which is assigned to the same assignee. The assembly 28 includes a stator 30 mounted within the bore 20 in the housing 18, which is mounted for movement toward and away from the disc 16. The stator 30 is prevented from rotating within the bore 20 by means of a pin 32 positioned within a slot 34 in the bore 20 in line with a notch 36 on the periphery of the stator 30. The stator includes a threaded bore 38 and a number of cam grooves 40 on the face of the stator. The motion of the stator 30 is transferred to the friction pad 26 by means of a threaded shaft or screw 42 which is mounted in the threaded bore on the stator 30 and a piston 29 secured to the end of the screw 42 by a bolt fastener 43. In this regard, the piston 29 includes a skirt 31 which fits around the outer circumference of the housing 18 and is located within the caliper 22. The piston is sealed by means of an "O" ring seal 33 located around the outer circumference of the skirt 31 and an O ring 37 on the outside diameter of bolt fastener 43.

The stator 30 is moved toward the friction pad 26 by means of a cylindrical rotor 44, having a radial flange 46 at one end and a central bore 48, having a slot 50 along one side. The rotor 44 is positioned in the bore 20 of housing 18 with the face of the rotor flange 46 parallel to and spaced from the face of the stator 30. The face of flange 46 includes a number of cam grooves 52 which are positioned opposite to the cam grooves 40 in the stator 30. The rotary motion of the rotor 44 is converted to axial motion in the stator 28 by means of a number of balls 54 which are positioned in the grooves 40 and 52. The stator 30 is biased to the neutral position by means of a compression spring 56 which is positioned between the stator 28 and a flange 58 at the end of the bore 20.

In the normal operation of the brake, the rotor 44 is rotated to move the stator axially toward the disc 16. The friction pad 26 will engage the disc 16 initially imparting a frictional force to the surface of the disc 16. As the rotor 44 continues to rotate, the bridging member 22 will move to the left to bring the brake pad 24 into engagement with the surface of the disc 16 on the opposite side of the friction pad 26, as seen in FIG. 2. The pressure is then increased sufficiently to brake the rotary motion of the disc 16. When the rotor 44 is reversed to retract the friction pad 26, the spring 56 will push the stator 30 toward the rotor relieving the pressure of the friction pad 26 from the surface of the disc 16. In accordance with the present invention, the brake support assembly 10 will move the bridging member 22 in the opposite direction to release the friction pad 24 from the disc 16.

In this regard, the brake support assembly 10 includes a rectangular-shaped support block or plate 11 which has a central opening 13, a pair of stabilizing bosses 15 in one end and a recess 9 at the other end. The caliper or bridging member 22 includes a rectangular-shaped slot or opening 17 in the top which corresponds to the shape of the block 11. The bridging member 22 is mounted on the block 11 by inserting the block into opening 17. The block is secured to frame 5 by means of a bolt 21 inserted through the opening 13 and screwed into a threaded hole 3 provided in the frame 5 with the bosses 15 aligned in corresponding holes (not shown in the frame 5). Means are provided on the block 11 to allow the bridging member 22 to float on the block 11. Such means is in the form of a liner 23 made of an elastomeric or resilient material such as rubber and molded on the outer surface of block 11.

In this regard, the liner 23 includes a lip 25 around one end of the liner and a serrated grease seal in the form member of rails 27 around the other end of the liner. The edges 39 of the liner are also provided with serrated grease seals in the form of rails 31 which extend from the lip 25 to the rails 27. The rails 27 and 41 and lip 25 form an enclosure with the inside surface of the opening 17 in bridging member 22. When the bridging member 22 is mounted on the block 11 a lubricant is applied to the surface of the liner 23, and the rails 27 and 41. The bridging member 22 is then pushed onto the liner 23 on the block 11. The lubricant will be sealed between the surface of the opening 17 in bridging member 22 and the liner 23 by the lip 25 and rails 27 and 41. The lubricant provides for freedom of motion of the bridging member 22 on the block 11 as well as minimizing corrosion of the metal surfaces of the opening 17.

The bridging member 22 is biased away from the disc 16 by means of a series of ribs 35 molded in strips on the liner 23 and located between the mounting block 11 and the bridging member 22. The ribs 35 in the normal position as seen in FIG. 2 are slightly compressed to follow the motion of the bridging member. When the bridging member 22 is moved to bring the friction pad 24 into engagement with the surface of disc 16, the ends of the ribs 35 will move with the bridging member as seen in FIG. 4. The ribs 35 will be under stress and on movement of the stator to release friction pad 26 from disc 16, the bridging member 22 will move in the opposite direction to release the friction pad 24 from disc 16. The bridging member 22 should move approximately one-half the distance of movement of the stator 30 in order to provide the same clearance between the pads 24, 26 and the disc 16 on both sides of the disc 16.

It should be noted that in a self-compensating type caliper as described herein, the retraction capability of the serrated elastomeric spring 35 is not affected by the compensating movement of the bridging member 22. This is due to the ability of the bridging member 22 to slip or slide with respect to the spring 35 whenever the elastic limit or retraction capabilities of the spring 35 is exceeded by the compensating movement of the bridging member 22.

I claim:

1. A support assembly for mounting a floating caliper-disc brake on a frame, the brake being of the type including a caliper for bridging a disc, said caliper having a rectangular mounting slot, a first friction pad supported by said caliper on one side of the disc, a housing supported by said caliper on the other side of the disc and having a bore and a second friction pad mounted in said bore for movement into engagement with the other side of the disc, said brake support assembly comprising a rectangular mounting block having a pair of stabilizing bosses at one end and an opening through the center, and a bolt positioned in said opening for securing said block to the frame with the bosses positioned in holes provided in the frame, said mounting block being adapted to be mounted in said rectangular mounting slot of said caliper whereby said caliper is free to float on said block when the second friction pad is moved into engagement with the disc to move the first friction pad into engagement with the opposite side of the disc, and spring means located between said block and said caliper for retracting said caliper to release said first friction pad from the disc when said second friction pad is moved away from the disc.

2. The assembly according to claim 1, wherein said spring means comprises an elastomeric spring molded on the outer surface of said mounting block.

3. The assembly according to claim 2, wherein said spring comprises a strip of ribs positioned to engage said caliper, said ribs being stressed by the movement of said caliper to engage said second friction pad with the disc whereby said ribs will bias the caliper back to the neutral position when the second friction pads is released from the disc.

4. The assembly according to claims 1, 2 or 3 wherein said caliper is free to move with respect to said spring means whenever the retraction capability of the spring means is exceeded.

5. A floating caliper disc brake assembly comprising
a support block having a central opening and a pair of stabilizer bosses on one end,
a bolt positioned in said opening for securing said mounting block to a frame with the stabilizer bosses seated in holes provided in the frame,
a caliper having a mounting slot corresponding to the shape of the support block, said caliper being mounted on said support block in a position to bridge the disc, said caliper being mounted to move freely on said support block,
a first friction pad mounted on said caliper on one side of the disc,
a housing mounted on said caliper on the other side of the disc,
a second friction pad supported in said housing for movement into engagement with the other side of the disc and
spring means positioned between said caliper and said support block for biasing said caliper to a position to release said first friction pad from said disc.

6. The assembly according to claim 5, wherein said spring means comprises a series of flexible ribs molded on said support block in a position to engage said caliper and to bias said caliper away from said disc.

7. The assembly according to claim 5 including a rubber liner molded on said support block and being located between said support block and said caliper, said liner including means for sealing the edges of the liner with the caliper to form a recess for a lubricant to allow the caliper to move freely on the support block.

8. The assembly according to claim 7 wherein said spring means comprising a strip of ribs positioned to engage the surface of said caliper and to move with said caliper to build up a bias force sufficient to move the caliper far enough to release the first friction pad from the disc on withdrawal of said second friction pad from said disc.

9. The assembly according to claim 6 or 8 wherein said ribs are free to slide on said caliper in the event the movement of said caliper exceeds the elastic limit of said ribs.

10. A floating caliper disc brake assembly comprising
a mounting block having a center opening means for mounting said block in a fixed relation to the disc brake assembly,
a resilient liner molded on said mounting block,
a caliper supported for linear movement on said block in a bridging relation to the edge of said disc,
a first friction pad mounted on said caliper in a position to engage one side of the disc,
a second friction pad supported on said caliper for movement into engagement with the other side of the disc,
said caliper moving said first friction pad into engagement the other side of said disc on movement of said second friction pad into engagement with the disc, and
means formed on said liner for biasing said caliper in a direction to release said friction pad from the disc on movement of the second pad away from the disc.

11. The assembly according to claim 10, wherein said biasing means comprise one or more strips of serrated ribs formed on said liner, said ribs being compressed on said caliper and stressed on movement of the caliper in the braking direction.

12. The assembly according to claim 11 wherein said caliper is free to slide on said ribs whenever the retraction capability of said stressed ribs is exceeded by the movement of said caliper.

13. The assembly according to claims 10, 11 or 12 including means formed on said liner for sealing the edges of said liner with said caliper whereby lubricant applied to said liner will be sealed in the space between the liner and said caliper.

14. A floating caliper disc brake comprising a rectangular mounting block having a pair of stabilizing bosses on one end and a central opening, a bolt positioned in said opening to secure said block to the frame,
a resilient liner molded on said block,
a caliper mounted to float on said mouting block and being located in a position to bridge the edge of the disc,
a first friction pad supported by said caliper for movement into engagement with one side of the disc,
a housing mounted on said caliper on the opposite side of the disc,
a second friction pad supported in said housing for movement into engagement with the other side of said disc, and an elastomeric spring located between said mounting block and said caliper for biasing said caliper to release said first friction pad from the disc on movement of said second friction pad away from the disc.

15. The assembly according to claim 14 wherein said resilient liner is molded on said mounting block, said spring comprising a strip of ribs formed on said liner in a position to engage said caliper.

* * * * *